April 26, 1960 Y. CHAPOU 2,934,091
MIXING COCK
Filed July 10, 1957 3 Sheets-Sheet 1

INVENTOR
Yves Chapou
BY: Michael S. Striker
agt.

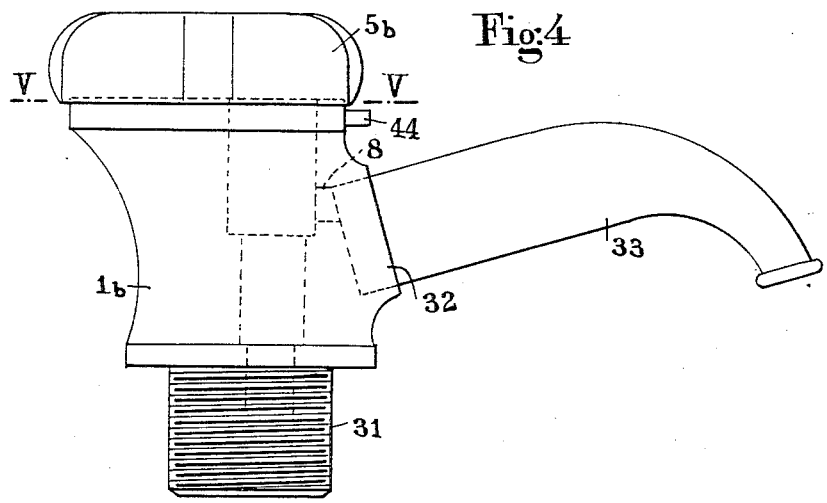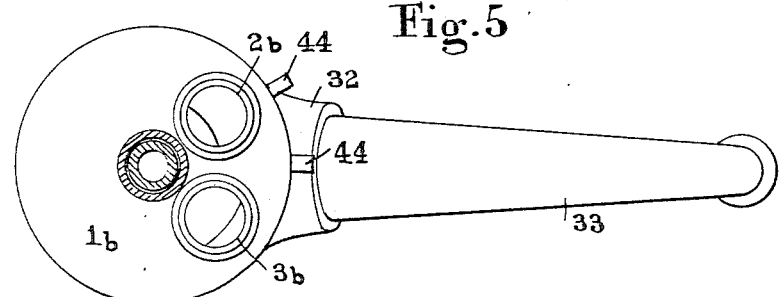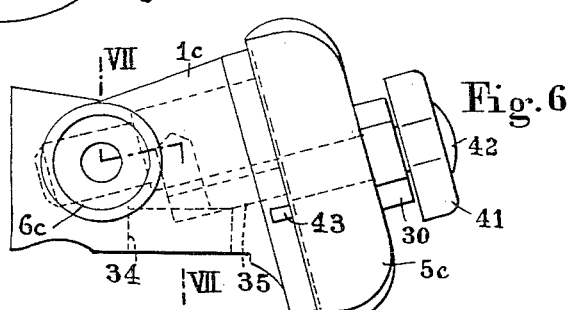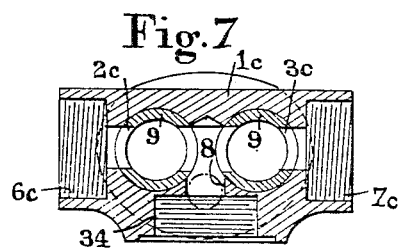

April 26, 1960     Y. CHAPOU     2,934,091
MIXING COCK

Filed July 10, 1957     3 Sheets-Sheet 3

INVENTOR
Yves Chapou
BY: Michael A. Striker
agt.

United States Patent Office 2,934,091
Patented Apr. 26, 1960

2,934,091

MIXING COCK

Yves Chapou, Paris, France

Application July 10, 1957, Serial No. 670,941

Claims priority, application France July 19, 1956

3 Claims. (Cl. 137—628)

This invention relates to cocks in general and has particular reference to a mixing cock adapted, by the actuation of a single control knob or handle, to mix hot water and cold water in any desirable proportions for delivering water at a suitable, desired temperature, for example in a shower or bath installation. An apparatus of this type must be capable to effect any desired mixing of hot water and cold water, as well as the complete opening of any one of the two water inlets while simultaneously closing completely the other one.

Now many types of mixing cocks have already been proposed. In certain known designs, the delivery of cold water and hot water is controlled by means of a screw adapted to lift two valves carrying orifices of opposite directions, so arranged that when the valve complete assembly is raised the hot water output increases as the cold water output decreases.

In other known propositions a single cam is mounted within a hollow body and adapted simultaneously to actuate two valves controlling the cold water and hot water inlets to produce the same action as in the design broadly set forth hereinabove. However, the use of a single cam for actuating the two valves offers a serious drawback, in that it is not possible to design a cam adapted to control simultaneously and efficiently the two valves by means of two different successive portions.

The mixing cock according to this invention is of the type comprising two pistons actuated by a cam-forming control knob or wheel and adapted to slide in two parallel bores formed in the cock body, both water inlets opening into the bottom of these bores which communicate at an intermediate point of their height or length with a common outlet passage. The sliding pistons are each mounted in a fixed perforated socket screwed in the relevant bore and the end of this socket which is adjacent to the bottom of the corresponding bore constitutes the seat of a valve carried by the relevant end of the piston.

According to an essential feature of this arrangement, the control knob or wheel carries two separate cams concentric with each other and acting on the relevant end of one and the other sliding piston, the piston axes being preferably disposed on a common circle. The different contours of these cams are such that according to its position the control knob or wheel may either close the cock completely, or open any desired water inlet thereof while simultaneously closing the other water inlet, or produce any desired combinations of intermediate piston positions, this possibility resulting from the fact that the cams have a maximum angular development of the order of 360° for each of them.

Other features and advantages of the mixing cock according to this invention will appear as the following description proceeds with reference to the attached drawings forming part of this specification and illustrating diagrammatically by way of example a few typical embodiments thereof. In the drawings:

Figure 4 is a side elevational view of a mixing cock according to the invention, which is specially designed as a washstand cock;

Figure 5 is a section taken upon the line V—V of Fig. 4;

Figure 6 is a side elevational view of a mixing cock according to this invention, which is intended for use more particularly above a sink and is provided with means for adjusting the output of mixed water;

Figure 7 is a sectional view of the same cock, the section being taken upon the line VII—VII of Fig. 6;

Figure 1:
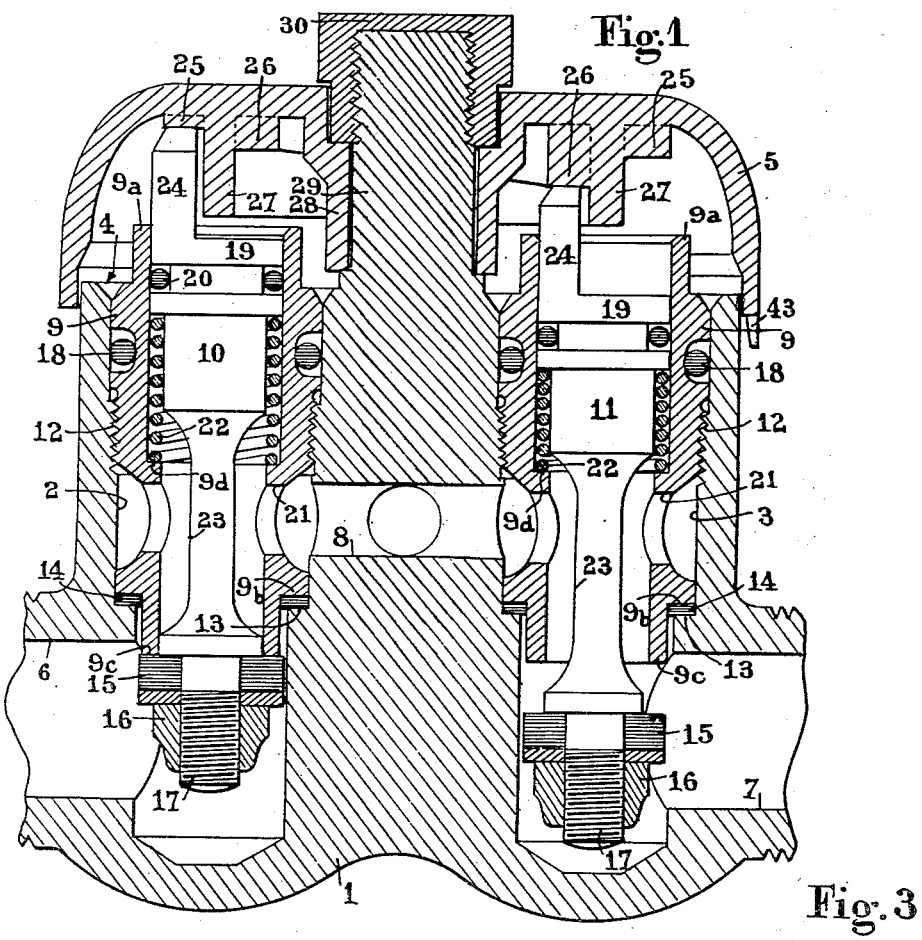
Figure 1 is an axial section showing a first embodiment of a mixing cock constructed according to the teachings of this invention.

The mixing cock illustrated in Fig. 1 consists of a body 1 comprising two blind bores 2, 3 having their axes parallel and disposed on a common circle the centre of which is coincident with the axis of the body 1. These blind bores extend from the face 4 of the body 1 on which a control knob or wheel 5 is mounted. In the bottom of each bore 2, 3 a water inlet, in the form of a port 6 or 7, is provided for the supply of cold and hot water. On the other hand, these bores 2, 3 communicate at an intermediate point of their height or length with a passage 8 through which the mixed water is delivered to the outside.

In each bore 2, 3 a socket 9 is locked against movement, for example by screwing, and has slidably mounted therein a piston 10 or 11 controlling the corresponding water inlet. In the embodiment shown the socket 9 is simply screwed in a tapped portion 12 of the bore 2 or 3. To facilitate the screwing in or out of the sockets, the outer end 9a of each socket is of polygonal configuration.

The opposite end of each socket comprises a shoulder 9b bearing against a reverse shoulder 13 formed in the bore 2 or 3, a sealing gasket 14 being interposed therebetween. The edge 9c of this end of sockets 9 constitutes a seat co-acting with a valve 15 secured by a nut 16 on the screw-threaded end 17 of the corresponding piston 10 or 11.

The outer wall of each socket 9 has a groove formed therein which contains a toroidal packing ring 18. Similarly, the end portion 19 of each piston which is opposite to the end 17 has a groove formed therein which contains a toroidal packing ring 20. Each socket 9 has one or more transverse perforations 21 formed therein which are level with the duct leading to the outlet passage 8. A shoulder 9d formed in each socket 9 in the vicinity of the perforations 21 acts as a seat to a spring 22 constantly urging the end 19 of the corresponding piston to press the valve 15 against the seat 9c formed on the socket. Adjacent to the end 17 of each piston splines 23 of adequate configuration are formed to provide as already known in the art a gradually increasing water passage as the valve 15 is moved away from its seat.

The ends 19 of pistons 10 and 11 are each provided with a notch located on a different side. Thus, the end 19 of piston 10 is notched on the inner side situated near the centre of the body 1, so that this end has a projection 24 on the other side only. Besides, the end 19 of piston 11 is notched on the outside and its projection 24 is thus on the inside. These projections 24 constitute the cam followers of the device of this invention, as will be made clear presently. According to this invention, the inner face of the control knob 5 carries two concentric circular cams 25, 26 separated by a projecting ring 27 also concentric. The cam 25 is adapted to actuate the cam-follower projection 24 of piston 10, and the cam 26 is adapted to actuate the cam-follower projection 24 of piston 11. On the other hand, the central ring 27 registers with the inner or outer corresponding wall of the projection 24 of the end 19 of each piston, so that it assists in keeping the pistons 10 and 11 in their suitable respective angular positions while holding them against any rotational movement.

The control knob or wheel 5 is rotatably mounted on the body 1. To this end, it comprises a central socket 28 fitting around a central extension or projection 29 of the body 1 which is of circular cross-section. This extension 29 is provided with a screw threaded outer end adapted to receive a nut 30 for keeping the knob 5 in position.

The cams 25 and 26 have a variable lift so as to push more or less the cam-followers or projections 24 of the pistons and unseat to the corresponding extent the valves 15. Thus, more or less cold water or hot water is allowed to flow between the valve and the seat, then along the pistons, through the perforations 21 and outlet passage 8.

The different contours of the two separate cams 25 and 26 are so determined that when the control knob 5 is actuated the following sections are obtained:

The cam-followers or projections 24 of the pistons are not depressed; under these conditions, the cock is closed completely;

One piston is gradually depressed, the other remaining in its valve-closing position;

The depressed piston is held and released as the other piston is gradually depressed, and The first piston is fully released as other piston is depressed home.

Thus, it is apparent that any desired combination involving intermediate positions of the pistons and therefore any desired proportions in the mixture may be obtained, in addition to the complete closing of the passage in both bores and the closing of one bore while the other one is completely closed.

Figure 9:
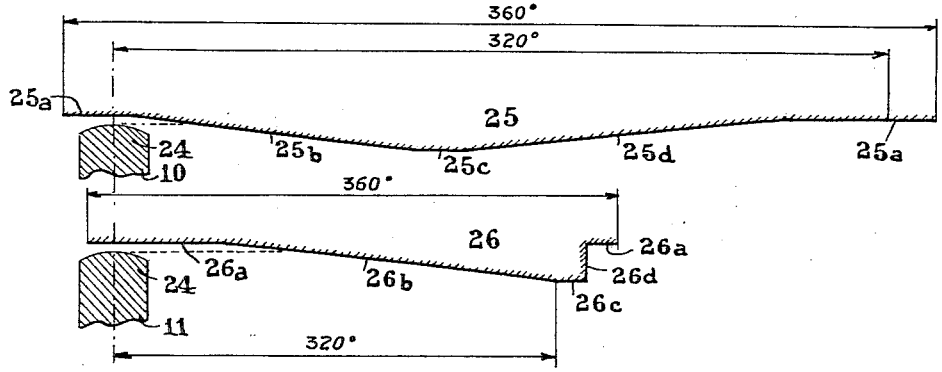
Figure 9 is a diagram showing the development of the two cams carried by the control knob of the mixing-cock according to this invention.

Figure 9 illustrates the diagrams of the cams 25 and 26. As will be seen in this figure, the outer cam 25 has a first horizontal portion 25a of moderate length which cannot actuate the cam-follower projection 24 of piston 10 and is followed by an inclined portion 25b ensuring a gradual depression of this piston, a portion 25c holding the piston completely depressed, a portion 25d having the same inclination as the portion 25b but in the reverse direction to permit the rising movement of the piston, and finally again the relatively short horizontal portion 25a which leaves the piston unactuated; thus, a 360° cam is obtained. The other cam 26 acting simultaneously on the piston 11 comprises in succession: a horizontal inoperative portion 26a, an inclined portion 26b which gradually depresses the piston, a short flat portion 26c holding the piston depressed home, and finally a sharp shoulder 26d leading again to the initial flat portion 26a; all these portions represent 360° as in the other cam contour.

Both cams 25 and 26 are so disposed in relation to each other that the beginning of their flat portions 25a and 26a are coincident above the cam-follower projections 24 of pistons 10 and 11, but do not engage same. The pistons are then raised by the force of springs 22 alone, so that the valves are seated and both inlets completely closed.

By rotating the control knob or wheel 5 the inclined portion of cam 25 is brought over the projection 24 of piston 10 and the latter is thus progressively depressed to open the corresponding water inlet. During this time the flat portion 26a of cam 26 moves over the projection 24 of piston 11 without acting thereon, so that the corresponding water inlet remains closed during the gradual opening of the other inlet.

Then, as the control knob or wheel 5 is rotated to a subsequent angular position, the flat portion 25c of maximum height is brought over the projection 24 of piston 10, so that the corresponding water inlet is fully open. During this period the other inlet remains closed.

Next, the rotation of the control knob 5 brings the portion 25d of cam 25 over the projection of piston 10 and the portion 26b of cam 26, which is inclined in the opposite direction, overlies the projection of piston 11. The inlet corresponding to this piston 10 is thus gradually closed by the pressure of spring 22 which urges the piston upwards, while the inlet corresponding to piston 11 is gradually opened.

Then, the cam portion 26c holds the piston 11 in its fully-open position, the piston 10 being brought back to its position in which it closes completely the relevant water inlet. At this time the rotation of the control knob or wheel 5 is stopped by a check member 44 carried by the body 1 and engaged by a suitable projection 43 provided on the knob. To re-close the cock completely it is thus necessary to rotate the control knob in the reverse direction until the two initial flat portions 25a and 26a are brought again over the relevant pistons which close completely. Then the knob is stopped in this position by another check member 44 carried by the body 1 and engaged by the projection 43 of the knob 5. Both check members 44 are thus adapted to limit the useful amplitude of rotation of the knob 5 which represents about 320° (see the development diagram of cams 25 and 26 and the angular strokes of pistons 10 and 11 in Fig. 9).

However, these cam contours are given by way of illustration and example only and should not be construed as limiting the purpose of the invention, for different cam designs may be resorted to if desired, all the more as the provision of two separate cams permits a great variety in the choice and adjustment of the piston movements. This constitutes an extremely important feature with respect to known arrangement comprising a single cam actuating the two pistons or valves. Consequently, cam contours or profiles may be selected according to cases and applications with a view to provide a great variety of different adjustments ensuring any desired range of mixing actions.

It will be readily understood that the component elements of the mixing cock according to this invention may be easily and quickly dismantled. In fact, after the control knob or wheel 5 has been removed by loosening the nut 30, the polygonal end portions 9a of sockets 9 are readily accessible. Thus, it is very easy to unscrew these sockets and remove them from the bores 2 and 3 with their pistons 10, 11 as well as all the parts associated therewith, such as return springs 22, gaskets 14 and 18, and valve member 15.

Figure 2:
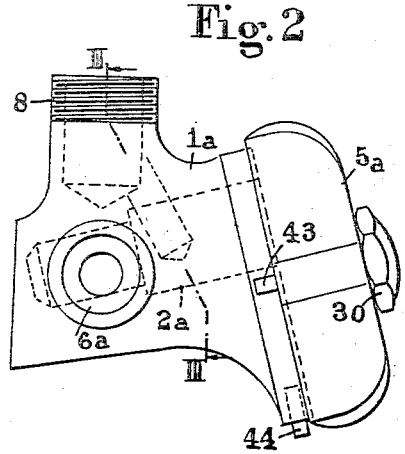
Figure 2 is an elevational side view of a similar cock designed more particularly for a shower installation.
Figure 3:
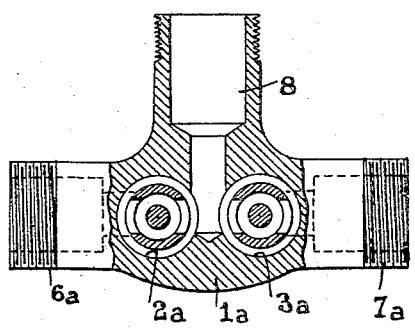
Figure 3 is a sectional view of the same cock, the section being taken upon the line III—III of Fig. 2.

The mixing cock according to this invention may have very different shapes according to cases and applications. Thus, Figs. 2 and 3 illustrate a mixing cock designed more particularly for equipping a shower installation. The body 1a of this cock is adapted to be mounted with its axis slightly inclined to the horizontal. Consequently, the two parallel bores 2a and 3a receiving the sliding pistons are slightly inclined to the horizontal. The control knob or wheel 5a is mounted on the face of body 1a which is opposite to that intended to be mounted on a wall or the like. The cold and hot water inlets 6a, 7a are disposed sidewise. Regarding the outlet passage 8, it is disposed substantially vertically to permit the fitting of a vertical pipe or a flexible tubing for supplying a sprinkling shower device. Of course, all the other members of the mixing cock are designed in accordance with the characteristics set forth hereinabove and illustrated in Fig. 1.

Figures 4 and 5 of the drawings illustrate another mixing cock designed more particularly for equipping a washstand. The body 1b of this cock is adapted to be mounted in a substantially vertical position on the rear edge of a washstand. The axes of both piston bores 2b and 3b are also substantially vertical and the control knob 5b is mounted above the upper face of the body 1b. The cold and hot water inlets are substantially vertical and open into the bottom portions of the aforesaid bores 2b and 3b. The supply pipe lines may be fitted inside the screw-threaded socket 31 provided for mounting the cock body 1b on a washstand. The outlet passage 8 leads into a female fitting 32 receiving a spout 33 from which the mixed water is adapted to flow into the washstand.

Figure 8:
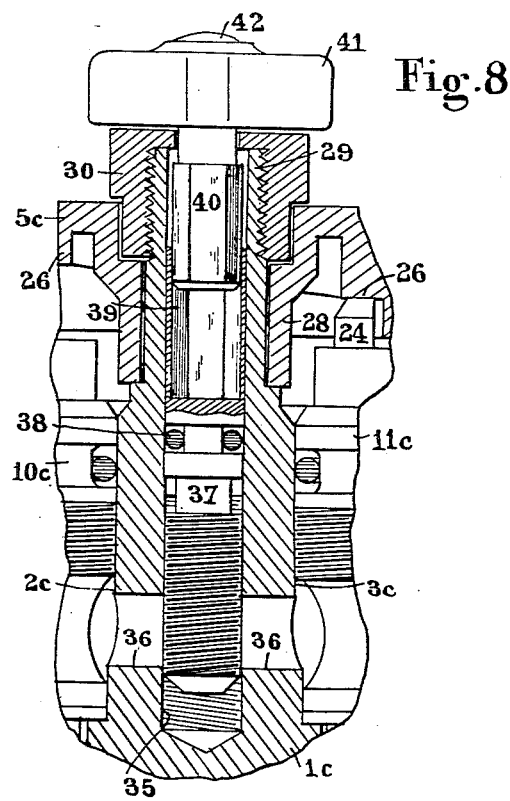
Figure 8 is a fragmentary sectional axial view of the same cock.

Figures 6, 7 and 8 illustrate a mixing cock designed more particularly for equipping a sink. The body 1c of this cock is adapted to be mounted in a manner substantially similar to that contemplated for the body 1a of the embodiment illustrated in Figs. 2 and 3, that is, with its axis slightly inclined to the horizontal, its rear face engaging a wall and its front face carrying the control knob 5c. On either side of the body 1c cold-water and hot-water inlet nozzles 6c and 7c having substantially horizontal axes, are provided. Thus, these nozzles open laterally in the bottom portion of the bores 2c and 3c into a cavity 34 in which the spout for delivering the mixed water may be fitted.

However, this mixing cock differs from the preceding ones in that it comprises, in addition, means for adjusting the output of mixed water. In fact, the body 1c has formed therein an axial bore 35 from which extends the delivery duct or passage communicating in turn through the medium of passages 36 with the bores 2c and 3c receiving the sliding pistons 10c and 11c. This bore 35 has mounted therein a needle valve or piston 37 having its lower end screwed in the tapped lower portion of bore 35. This piston 37 has a peripheral groove containing a sealing packing ring 38. Its end portion 39 opposite to the bore 35 is hollow and has a polygonal inner cross-section, for example square or hexagonal. A rod 40 of same cross-section engages this hollow end portion 39 and has secured on its upper end an auxiliary control knob 41 by means of a screw 42. The rod 40 extends through the nut 30 holding the control wheel 5c on the body 1c, as shown. This nut is screwed as in the preceding embodiments on an extension 29 of the body 1c, the axial bore 35 extending, of course, through this extension.

When the auxiliary control knob 41 is rotated, the polygonal-sectioned rod 40 carries along the hollow end portion 39 of piston 37 and slides inwards, the lower end of the piston being screwed in the lower tapped portion of bore 35, thereby efficiently ensuring the axial displacement of the piston in this bore. By actuating the auxiliary knob 41 it is therefore possible to bring the lower end of piston 37 in the lower portion of the bore 35 at the level of passages 36 and outlet passage 8 to reduce or increase more or less the cross-sectional area available for the mixed water, and finally adjusting the output thereof. Of course, this output adjustment system is also applicable to the mixing cocks described hereinabove with reference to the other figures of the drawings.

Besides, it will be readily understood that any modifications and alterations that may be deemed useful according to cases and applications may be brought to the mixing cock according to this invention, without departing from the subject-matter of this invention as set forth in the appended claims. Again, the mixing cock is not limited to the few embodiments shown and described herein.

What I claim is:

1. In a mixing valve, in combination, a housing; two valve means mounted in said housing, each being reciprocable between an open and a closed position; two cam follower means mounted respectively on said valve means, said cam follower means being formed with respective guide surfaces and cam engaging surfaces; cam carrier means rotatably fastened to said housing; two arcuate cams fixedly fastened to said carrier means coaxially relative to the axis of rotation thereof, said cams being radially spaced from each other and respectively abutting against said cam follower means for actuation of said valve means during rotation of said cam carrier means; and guide ring means mounted on said carrier means coaxial with said cams, said guide ring means engaging said guide surfaces for aligning said cam engaging surfaces with the coordinated cams.

2. In a mixing valve, in combination, a housing formed with two parallel bores; two valve means axially movable in said bores between respective open and closed positions; two cam follower means mounted respectively on said valve means and projecting from said bores; cam carrier means fastened to said housing for rotation about an axis parallel to and equidistant from said bores; and two arcuate cams fixedly fastened to said carrier means and extending therefrom towards said cam follower means in radially spaced concentric relationship coaxial with the axis of rotation of said cam carrier means, said cam follower means having cam-engaging surfaces displaced from the center lines of said bores respectively in directions inward and outward relative to the axis of rotation of said cam carrier means and one of said cams abutting only against one of said cam follower means and the other of said cams abutting only against the other of said cam follower means for actuating said valve means independently from each other during rotation of said cam carrier means.

3. In a mixing valve, in combination, a housing formed with two parallel bores; two valve means axially movable in said bores between respective open and closed positions; two cam follower means mounted respectively on said valve means and projecting from said bores, said cam follower means being formed with respective guide surfaces; cam carrier means fastened to said housing for rotation about an axis parallel to and equidistant from said bores; two arcuate cams fixedly fastened to said carrier means and extending therefrom towards said cam follower means in radially spaced concentric relationship coaxial with the axis of rotation of said cam carrier means for camming cooperation of said cams with said cam follower means; and guide ring means mounted on said cam carrier means intermediate said cams and coaxially therewith, said guide ring means engaging said guide surfaces for preventing rotation of said cam follower means about the center lines of said bores.

References Cited in the file of this patent

UNITED STATES PATENTS

| | | |
|---|---|---|
| 1,128,302 | Fausek et al. | Feb. 16, 1915 |
| 1,690,767 | Bloch | Nov. 6, 1928 |
| 1,845,627 | Rosewood | Feb. 16, 1932 |
| 2,354,960 | Morehouse | Aug. 1, 1944 |
| 2,575,940 | Brown | Nov. 20, 1951 |
| 2,653,628 | Spencer | Sept. 29, 1953 |